United States Patent
Nakajima

(10) Patent No.: US 8,446,617 B2
(45) Date of Patent: May 21, 2013

(54) IMAGE FORMING SYSTEM, IMAGE FORMING APPARATUS, AND JOB ISSUING METHOD

(75) Inventor: Yasuki Nakajima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1330 days.

(21) Appl. No.: 11/874,031

(22) Filed: Oct. 17, 2007

(65) Prior Publication Data

US 2008/0148265 A1  Jun. 19, 2008

(30) Foreign Application Priority Data

Dec. 18, 2006  (JP) ................................ 2006-339860

(51) Int. Cl.
  *G06F 3/12* (2006.01)
  *G06F 3/00* (2006.01)
  *G06K 15/00* (2006.01)
  *H04N 1/46* (2006.01)

(52) U.S. Cl.
  USPC .......... 358/1.15; 358/1.1; 358/501; 358/1.16; 715/743; 715/741; 715/751

(58) Field of Classification Search
  None
  See application file for complete search history.

(56) References Cited

U.S. PATENT DOCUMENTS

| 8,189,219 B2* | 5/2012 | Fukasawa ..................... 358/1.15 |
| 2002/0138322 A1* | 9/2002 | Umezawa et al. ................ 705/8 |
| 2004/0015687 A1* | 1/2004 | Chiarabini et al. ........... 713/153 |
| 2004/0080772 A1* | 4/2004 | Snyders ....................... 358/1.14 |
| 2004/0125402 A1* | 7/2004 | Kanai et al. .................. 358/1.15 |
| 2004/0187022 A1* | 9/2004 | Asada et al. .................. 713/200 |
| 2006/0015734 A1* | 1/2006 | Atobe .......................... 713/176 |
| 2006/0244995 A1* | 11/2006 | Kushida ...................... 358/1.15 |

FOREIGN PATENT DOCUMENTS

| JP | 08115277 A |   | 5/1996 |
| JP | 2001-257827 A |   | 9/2001 |
| JP | 2005-342964 A |   | 12/2005 |
| JP | 2005342964 A | * | 12/2005 |
| JP | 2006195811 A |   | 7/2006 |
| JP | 2006338451 A |   | 12/2006 |

* cited by examiner

*Primary Examiner* — Hilina S Kassa
(74) *Attorney, Agent, or Firm* — Canon USA, Inc., IP Division

(57) ABSTRACT

An image forming system including a plurality of image forming apparatuses installed in a plurality of areas and in communication with one another via a network includes a management unit configured to manage level information indicating a level related to information management with respect to each of the plurality of areas, and a job issuing unit configured to issue a job, including data for image formation, for causing at least one of the plurality of image forming apparatuses to perform image formation. The image forming system identifies at least one image forming apparatus that can be selected as a destination of the job issued by the job issuing unit based on the level information managed by the management unit.

16 Claims, 13 Drawing Sheets

FIG. 2

| AREA NAME | AREA TYPE | AREA SIZE | ALERT LEVEL |
|---|---|---|---|
| AREA A | OFFICE ROOM | MEDIUM | LOW |
| AREA B | OFFICE ROOM | LARGE | HIGH |
| AREA C | MEETING ROOM | SMALL | LOW |
| AREA D | MEETING ROOM | SMALL | LOW |
| ⋮ | ⋮ | ⋮ | ⋮ |
| AREA Z | OFFICE ROOM | SMALL | HIGH |

FIG. 4

| 400 | | | | |
|---|---|---|---|---|
| USER ID (401) | USER STATUS (402) | USER PRESENT LOCATION (403) | ENTRANCE PERMITTED AREA (404) | |
| 001 | EMPLOYEE – DEVELOPMENT DEPT | AREA A | AREA A, AREA B, AREA C, AREA D, AND AREA Z | |
| 002 | EMPLOYEE – DEVELOPMENT DEPT | AREA B | AREA B, AREA C, AND AREA D | |
| 003 | EMPLOYEE – GENERAL AFFAIRS DEPT | AREA C | AREA A, AREA C, AND AREA Z | |
| 004 | OUTSIDER – TEMPORARY STAFF | AREA A | AREA A | |
| ⋯⋯ | ⋯⋯ | ⋯⋯ | ⋯⋯ | |
| 999 | OUTSIDER – GUEST | OUT OF AREA | AREA C | |

FIG. 8

| DEVICE NAME | MODEL TYPE | INSTLLATION AREA |
|---|---|---|
| MFP-CL1 | Model C3200 | AREA A |
| MFP-CL2 | Model 2240 | AREA B |
| MFP-CL3 | Model 3200 | AREA C |
| MFP-CL4 | Model 3200 | AREA A |
| ⋮ | ⋮ | ⋮ |
| MFP-CL40 | Model 4500 | AREA Z |

IMAGE FORMING SYSTEM, IMAGE FORMING APPARATUS, AND JOB ISSUING METHOD

BACKGROUND OF THE INVENTION

1. Field of the Invention

The present invention relates to an image forming system, an image forming apparatus, and a job issuing method.

2. Description of the Related Art

Japanese Patent Application Laid-Open No. 2001-257827 discusses a method, using a plurality of image forming apparatuses connected with one another via a network, for outputting image data input by one image forming apparatus with another image forming apparatus. Such an operation is referred to as a "remote copy".

In addition, a conventional entry and exit management system manages and restricts an entrance into an office room or office building.

In order to enhance security, an entry and exit management system issues an identification (ID) card or a password to a registered user to restrict entry into an area to only registered individuals. Such an entry and exit management system requires a person entering such an area to present or enter the issued ID card or password, and permits the person to enter the area only when information described on the ID card or the password matches previously registered ID information or password.

Japanese Patent Application Laid-Open No. 2005-342964 discusses a system utilizing the above-described conventional entry and exit management system. The system discussed in Japanese Patent Application Laid-Open No. 2005-342964 determines, in the case of a network printing, whether a person exists in a room in which an image forming apparatus that has received a print instruction is installed, to determine whether to permit printing.

However, in the case where the above-described remote copy is performed under an environment in which an entry and exit management system operates, an area (room) in which an image forming apparatus that performs printing or outputting is installed may be different from an area in which a user who instructs a remote copy exists.

In this case, a person present in the area in which the image forming apparatus, which is an output destination of the instructed remote copy, is installed cannot be identified. For example, an outsider who has been temporarily permitted to enter the room may be present in the area. In such a case, information leakage may occur such that a print product obtained with the remote copy may be stolen, obtained, or read by the outsider.

Such a problem may occur in the case of performing a print job with an image forming apparatus from a personal computer via a network, in addition to the case of remote copy. That is, a user instructs printing from a computer in an area different from the area where the targeted image forming apparatus exists, a problem similar to the case of remote copying may arise.

SUMMARY OF THE INVENTION

The present invention is directed to an image forming system and an image forming apparatus configured to reduce a risk of information leakage via an output product obtained by image forming.

According to an aspect of the present invention, an image forming system including a plurality of image forming apparatuses installed in a plurality of areas and in communication with one another via a network includes a management unit configured to manage level information indicating a level related to information management with respect to each of the plurality of areas, a job issuing unit configured to issue a job, including data for image formation, for causing at least one of the plurality of image forming apparatuses to perform image formation, and an identification unit configured to identify at least one image forming apparatus as a destination of the job issued by the job issuing unit based on the level information managed by the management unit.

According to yet another aspect of the present invention, an image forming apparatus connected via a network to a plurality of other image forming apparatuses installed in a plurality of areas includes an acquisition unit configured to acquire information about an area from a management device connected to the image forming apparatus via the network and configured to manage level information indicating a level related to information management with respect to each of the plurality of areas, a job issuing unit configured to issue a job for causing at least one of the plurality of image forming apparatuses to perform image formation, and an identification unit configured to identify at least one image forming apparatus as a destination of the job issued by the job issuing unit based on the information about the area acquired by the acquisition unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principle of the invention.

FIG. 2 illustrates an example of an area information table according to an exemplary embodiment of the present invention.

FIG. 4 illustrates an example of a user information table according to an exemplary embodiment of the present invention.

FIG. 8 illustrates an example of device information according to an exemplary embodiment of the present invention.

DETAILED DESCRIPTION OF THE EMBODIMENTS

Various exemplary embodiments, features, and aspects of the present invention will now herein be described in detail with reference to the drawings. It is to be noted that the relative arrangement of the components, the numerical expressions, and numerical values set forth in these embodiments are not intended to limit the scope of the present invention unless it is specifically stated otherwise.

Figure 1:
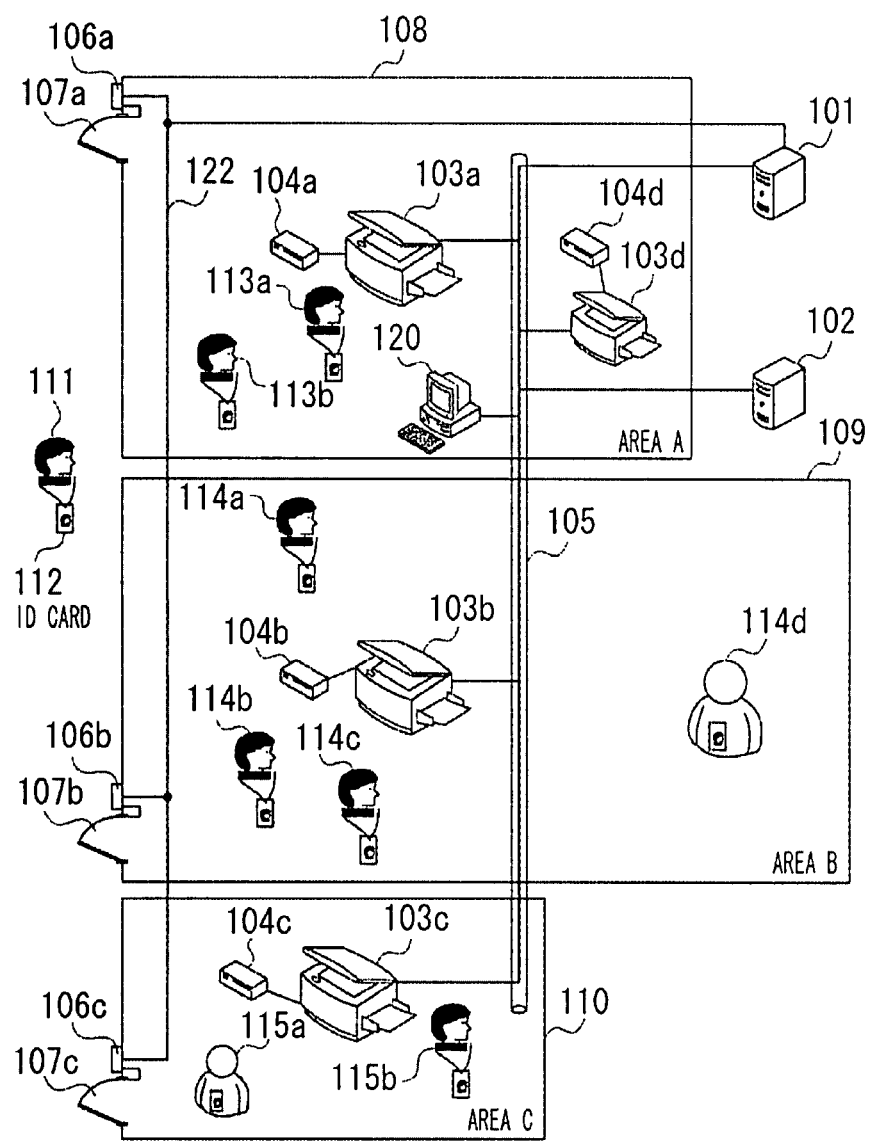
FIG. 1 illustrates an exemplary configuration of an image forming system according to an exemplary embodiment of the present invention.

FIG. 1 illustrates an exemplary configuration of an image forming system according to an exemplary embodiment of the present invention.

Referring to FIG. 1, area A 108, area B 109, and area C 110 are spaces, such as a room, that are physically partitioned by a wall or the like from other spaces (hereinafter referred to as an "area"). While three areas are illustrated in FIG. 1, the number of areas can be greater or smaller than three.

The area A 108, the area B 109, and the area C 110 include electric lock doors 107a, 107b, and 107c, respectively. Furthermore, the area A 108, the area B 109, and the area C 110 include non-contact integrated circuit (IC) card readers (hereinafter referred to as "IC card readers") 106a, 106b, and 106c, respectively, for reading identification (ID) information on an ID card that a user carries to identify the user at electronic lock doors 107a, 107b, and 107c.

The IC card readers 106a through 106c are located outside of area A 108, area B 109, and area C 110, respectively. Additional card readers can be located inside area A 108, area B 109, and area 110 C. Thus, when a user carrying an ID card (described below) enters or leaves area A 108, or area B 109, or area C 110, IC card readers 106a, 106b, and 106c can detect a user entering or exiting a specific area.

Users 111, 113a, 113b, 114a through 114d, 115a, and 115b use the image forming system according to the present embodiment. Each of these users carries an ID card 112 that records ID information for identifying each user.

In the present embodiment, the ID card 112 can be a non-contact IC card utilizing radio frequency identification (RFID) technology.

In addition, the ID card 112 can be a contact type IC card. In this case, a contact type IC card reader is used for each of the IC card readers 106a through 106c. As described above, the ID card 112 records a user ID unique to each of the users 111, 113a, 113b, 114a through 114d, 115a, and 115b.

An entry and exit management server 101 operates in cooperation with the IC card readers 106a through 106c, and stores and manages entering/exiting person management information and area information about each area.

A device management server 102 manages information about an installation location of each of image forming apparatuses 103a through 103d, which are installed within the image forming system. Each of the image forming apparatuses 103a through 103d is a multifunction peripheral (MFP), such as a digital copying machine.

IC card readers 104a through 104d are connected to the image forming apparatuses 103a through 103d respectively. The IC card readers 104a through 104d are used for authenticating a user of the image forming apparatuses 103a through 103d (hereinafter may be referred to as a "device"). The user can log into the image forming apparatuses 103a through 103d using the ID card 112.

In the image forming system according to the present embodiment, the ID card 112, which is used by the user when entering or exiting areas A 108, B 109, and C 110, can be used for the user authentication by the image forming apparatuses 103a through 103d.

A personal computer (PC) 120 is capable of sending a print job to the image forming apparatuses 103a through 103d via a network 105. The image forming apparatuses 103a through 103d each receive the print job from the PC 120, form an image according to the print job, and output a print product of the print job.

The network 105 can include any type of network structure, such as a wireless local area network (WLAN) or Ethernet®. Each of areas A 108, B 109, and C 110 are connected to the network 105. The entry and exit management server 101, the device management server 102, the image forming apparatuses 103a through 103d, and the PC 120 are in communication with one another via the network 105.

The number of image forming apparatuses and PCs connected to the network 105 is not limited to the number of devices illustrated in FIG. 1.

In the present embodiment, the IC card readers 106a through 106c are connected to the entry and exit management server 101 via a cable 122. Alternatively, each of the IC card readers 106a through 106c can be connected to the network 105. The IC card readers 106a through 106c and the entry and exit management server 101 can also be connected via a wireless communication (e.g., Bluetooth).

In the present embodiment, the entry and exit management server 101 and the device management server 102 are installed in an area other than areas A 108, B 109, and C 110, such as a separate server room (not shown). However, the entry and exit management server 101 and the device management server 102 can be installed in any location, e.g., any one of areas A 108, B 109, or C 110, that would enable practice of the present invention.

Figure 13:
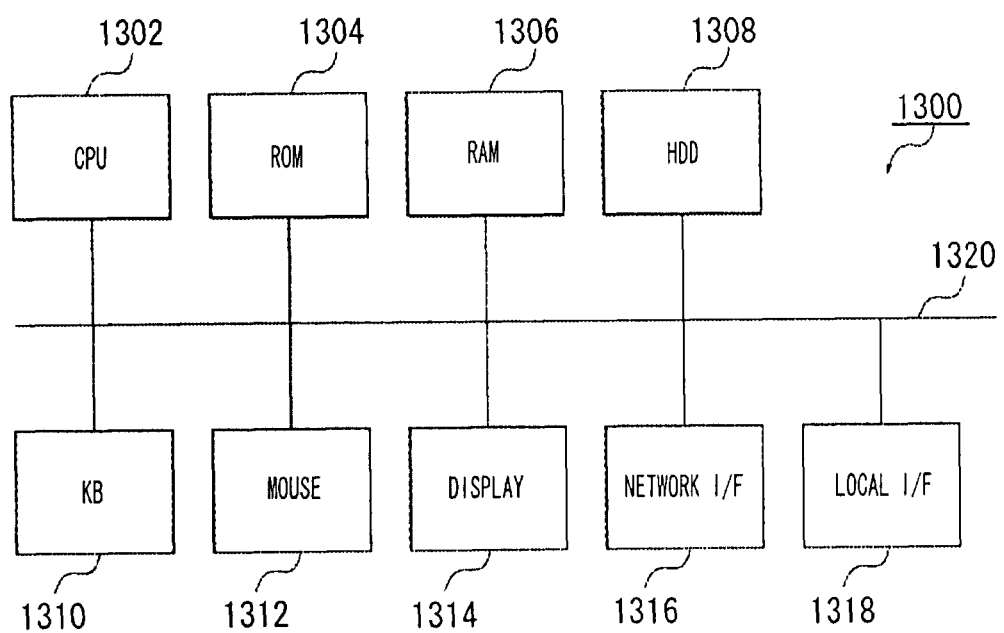
FIG. 13 illustrates an example of a configuration of an information processing apparatus constituting an entry and exit management server, a device management server, or a personal computer according to an exemplary embodiment of the present invention.

FIG. 13 illustrates an exemplary hardware configuration of an information processing apparatus 1300 that constitutes the entry and exit management server 101, the device management server 102, or the PC 120.

A central processing unit (CPU) 1302, a read-only memory (ROM) 1304, a random access memory (RAM) 1306, a hard disk drive (HDD) 1308, a keyboard (KB) 1310, a mouse 1312, a display 1314, a network interface (I/F) 1316, and a local I/F 1318 are connected with one another via a system bus 1320.

The CPU 1302 executes a program stored on the ROM 1304 or the HDD 1308 and loaded to the RAM 1306 to control the information processing apparatus 1300. The ROM 1304 stores the program to be executed by the CPU 1302 and information unique to the information processing apparatus 1300. The RAM 1306 serves as a work memory for the CPU 1302 in executing a program. The HDD 1308 stores various application programs.

In the case where the information processing apparatus 1300 is used as the entry and exit management server 101, the HDD 1308 stores an area information table 200, entering person management information 300, and a user information table 400, which are described below with reference to FIGS. 2 through 4.

In the case where the information processing apparatus 1300 is used as the device management server 102, the HDD 1308 stores a device information table 800, which is described below with reference to FIG. 8.

The keyboard 1310 and the mouse 1312 are used by the user to enter information for operating the information processing apparatus 1300. The display 1314 displays various information about the information processing apparatus 1300.

The network I/F 1316 is an interface for locally connecting the information processing apparatus 1300 with the network 105. The local I/F 1318 is an interface, such as a universal serial bus (USB), for locally connecting the information processing apparatus 1300 with various devices.

In the case where the information processing apparatus 1300 is used as the entry and exit management server 101, the local I/F 1318 serves as an interface between the information processing apparatus 1300 and the IC card readers 106a through 106c via the cable 122.

Figure 9:
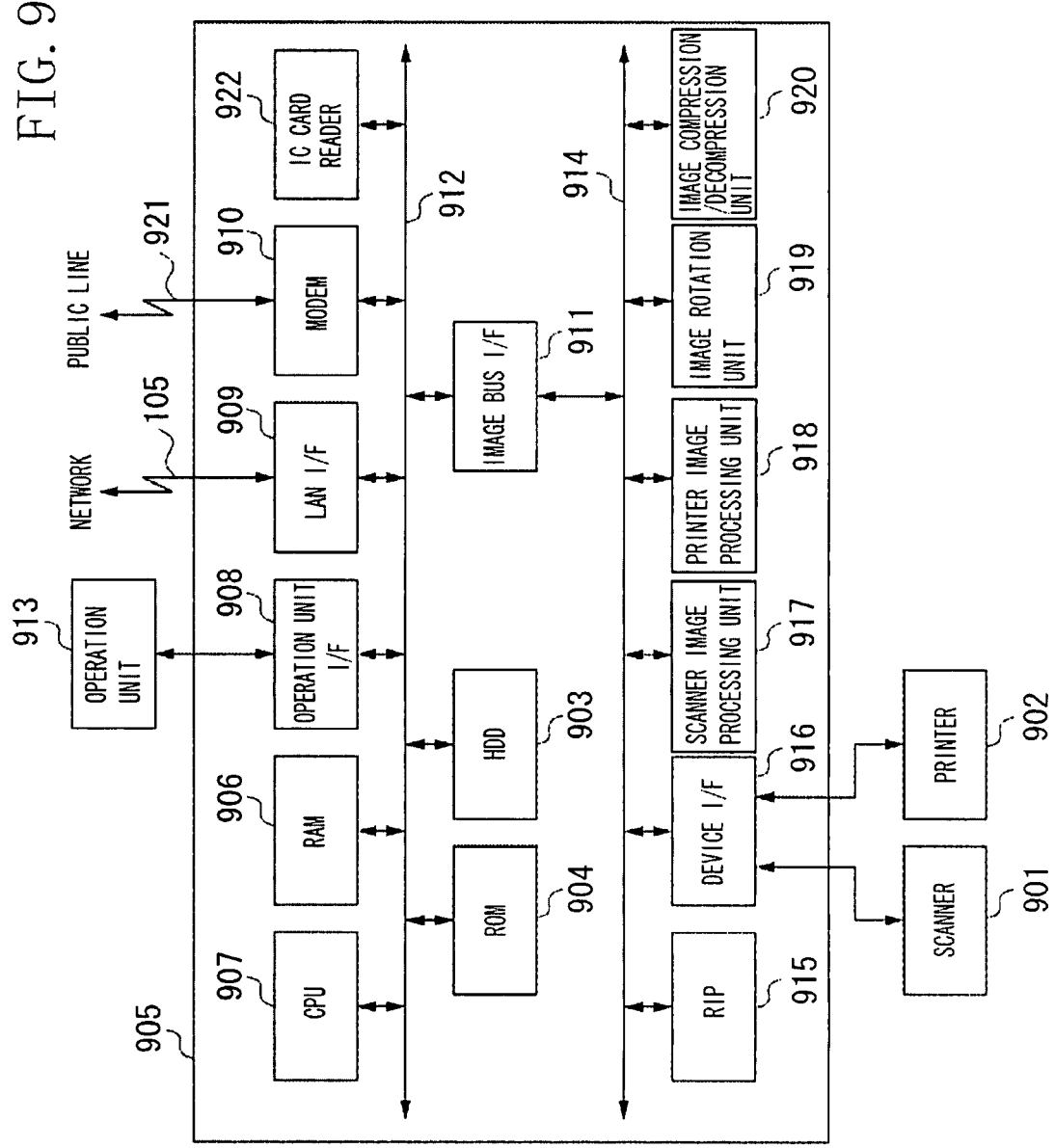
FIG. 9 illustrates an exemplary configuration of an image forming apparatuses according to an exemplary embodiment of the present invention.

FIG. 9 illustrates an exemplary configuration of each of the image forming apparatuses 103a through 103d.

Referring to FIG. 9, the image forming apparatuses 103a through 103d each include a controller unit 905. A scanner 901 and a printer 902 are connected to the controller unit 905. The controller unit 905 is connected to the network 105 and a public line (wide area network (WAN)) 921.

The image forming apparatuses 103a through 103d each have a copy function, a printer function for printing out a print job received via the network 105, a facsimile transmission function performed via the public line 921, and an image sending function performed via the network 105. The controller unit 905 controls input and output of image information and device information used for these functions, and controls each of the image forming apparatuses 103a through 103d.

The controller unit 905 includes a CPU 907. The CPU 907 activates an operating system (OS) based on a boot program stored in a ROM 904 and reads and executes various control programs stored on an HDD 903, using a RAM 906 as a work area. The HDD 903 stores image data in addition to the various programs.

The RAM 906, the ROM 904, the HDD 903, an operation unit I/F 908, a LAN I/F 909, a modem 910, and an image bus I/F 911 are connected to the CPU 907 via a system bus 912.

The operation unit I/F 908 is an interface with an operation unit 913. The operation unit I/F 908 transfers to the operation unit 913 image data to be displayed thereon. In addition, the operation unit I/F 908 transfers a signal generated by a user input via the operation unit 913 to the CPU 907.

The operation unit 913 includes a display unit and an input unit. The display unit displays a current setting state for each function of the image forming apparatuses 103a through 103d and an information input screen for inputting setting information for each function. The input unit includes various keys for inputting setting information for each function.

The operation unit 913 further includes a numeric keypad for inputting a value for the number of copies and a phone number used in sending a facsimile. The operation unit 913 also includes a clear button, a reset button, and function buttons, which can be pressed by the user to execute various functions or perform various settings.

In addition, the operation unit 913 includes a start button and a stop button. The start button can be operated by a user to start a job, such as a copy job, a facsimile job, or a scan job. The stop button can be operated by a user to stop a currently performed job.

Furthermore, the operation unit 913 includes a display having a touch panel. The user can enter information for various other settings via the touch panel display. A liquid crystal display (LCD) is used for the display.

The LAN I/F 909 connects the controller unit 905 with the network 105. The LAN I/F 909 inputs and outputs information via the network 105. The modem 910 connects the controller unit 905 with the public line 921. The modem 910 inputs and outputs information via the public line 921.

The image bus I/F 911 connects an image bus 914 with the system bus 912. The image bus I/F 911 is a bus bridge for converting a data structure. The image bus 914 can be a peripheral component interconnect (PCI) bus or Institute of Electrical and Electronic Engineers (IEEE) 1394 bus, via which image data can be transferred at a high speed.

A raster image processor (RIP) 915, a device I/F 916, a scanner image processing unit 917, a printer image processing unit 918, an image rotation unit 919, and an image compression/decompression unit 920 are connected to the image bus 914.

The RIP 915 rasterizes page description language (PDL) code included in a print job into a bitmap image. The device I/F 916 is an interface between the controller unit 905 and each of the scanner 901 and the printer 902.

The scanner image processing unit 917 performs various processing, such as correction, processing, and editing, on image data input by the scanner 901. The printer image processing unit 918 performs processing, such as image correction and resolution conversion, on image data to be printed out.

The image rotation unit 919 rotates image data. The image compression/decompression unit 920 compresses or decompresses multivalued image data according to Joint Photographic Experts Group (JPEG) format. In addition, the image compression/decompression unit 920 compresses or decompresses binary image data according to Joint Bi-level Image Experts Group (JBIG) format, Modified Modified Read (MMR) format, or Modified Huffman (MH) format.

As described above, the CPU 907 of the controller unit 905 controls all accesses between the controller unit 905 and various devices connected via the system bus 912 according to various control programs. Furthermore, the CPU 907 performs a control operation to read image data from the scanner 901 via the device I/F 916, to perform predetermined processing on the read image data, and to output the processed image data to the printer 902 via the device I/F 916.

FIG. 2 illustrates an example of the area information table 200 handled by the entry and exit management server 101 according to the present embodiment. The area information table 200 is stored on the HDD 1308 of the entry and exit management server 101. The area information table 200 includes items, such as area type information 201, area size information 202, and information 203 about a current alert level in an area for each of areas A 108, B 109, and C 110.

The area type information 201 indicates a purpose of use of the area. Information indicating a purpose of use includes "office room", "meeting room", "reception room", "lounge", etc. A setting for the area type information 201 is not changed unless a configuration of the area is changed.

The area size information 202 indicates the size of an area. In the present embodiment, the area size information 202 is expressed by three levels, "large", "medium", and "small". The area size information 202 can be expressed by a larger number of levels, wherein each level is divided into a smaller area size. Alternatively, the size of an area can be expressed by a numerical value.

The alert level information 203 indicates a level of management for a particular area. In the present embodiment, the alert level information 203 describes a degree of risk of information leakage. In the present embodiment, the alert level information 203 is expressed by two levels, "high" and "low".

The area type information 201 and the area size information 202 of the area information table 200 can be set by an administrator of the system by accessing the entry and exit management server 101 via a PC (e.g., the PC 120). The entry and exit management server 101 automatically sets the alert level information 203. The operation for setting the alert level information 203 performed by the entry and exit management server 101 is described below.

Figure 3:
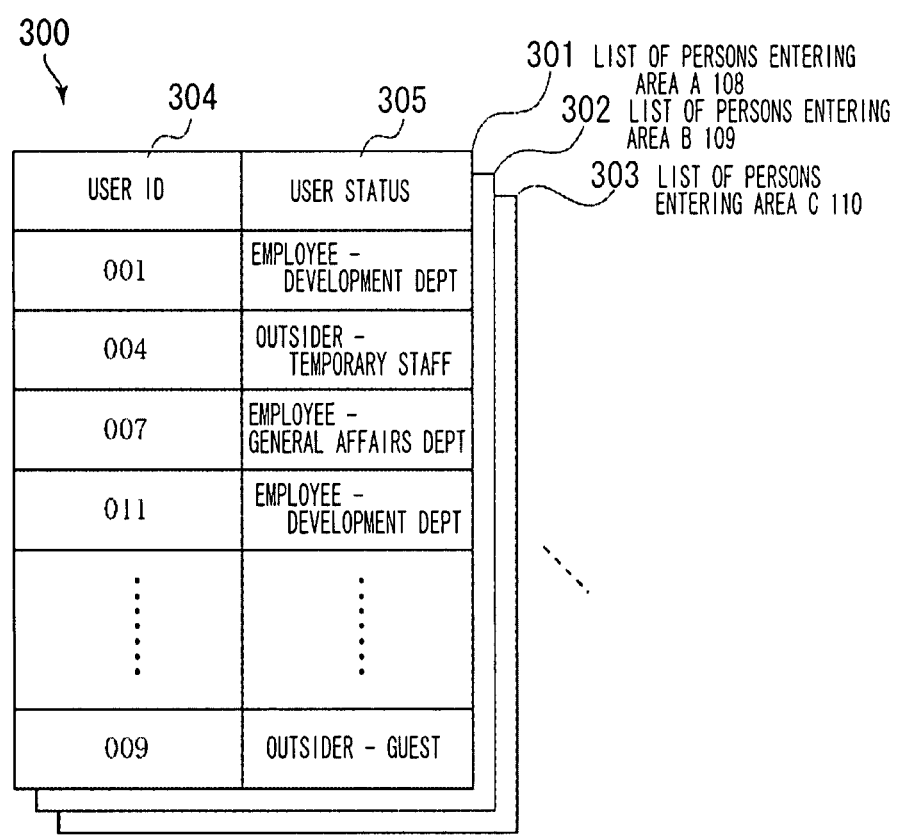
FIG. 3 illustrates an example of entering/exiting person management information according to an exemplary embodiment of the present invention.

FIG. 3 illustrates an example of entering person management information 300, which is handled by the entry and exit management server 101 according to the present embodiment.

The entering person management information 300 is stored on the HDD 1308 of the entry and exit management server 101. The entering person management information 300 includes a plurality of entered personnel lists corresponding to each of areas A 108, B109, and C 110.

An entered personnel list 301 corresponds to the area A 108, an entered personnel list 302 corresponds to the area B 109, and an entered personnel list 303 corresponds to the area C 110. That is, the entering person management information 300 is generated and managed for each area.

Each of the entered personnel list 301, entered personnel list 302, and entered personnel list 303 includes user ID information 304 and user status information 305. The user ID information 304 indicates a user ID of a user who currently exists in an area. The user status information 305 can be acquired from the user information table 400, which is described below with reference to FIG. 4.

When a user, carrying ID card 112, enters an area, the user inserts or presents the ID card 112 into or to any one of the IC card readers 106a through 106c. Thus, the entered personnel list for the corresponding area is updated. This operation is described below.

FIG. 4 illustrates an example of the user information table 400 handled by the entry and exit management server 101 according to the present embodiment. The user information table 400 includes user IDs of all registered users using the image forming system according to the present embodiment.

User ID information 401 describes a registered user ID. User status information 402 describes user status information of a user having the corresponding user ID. The user ID information 401 and the user status information 402 are similar to the user ID information 304 and the user status information 305 in FIG. 3.

User present location information 403 describes information about the area the where the user is currently located. Entrance permitted area information 404 describes information about an area that the user has been permitted to enter. The entrance permitted area information 404 can include information about a plurality of areas.

The user ID information 401, the user status information field 402, and the entrance permitted area information 404 can be set by the system administrator by accessing the entry and exit management server 101 via a PC (e.g., the PC 120). The user present location information 403 can be acquired by referring to the entering person management information 300.

Processing for managing entry into and exit from an area by a user is described below with reference to FIGS. 5 and 6.

Figure 5:
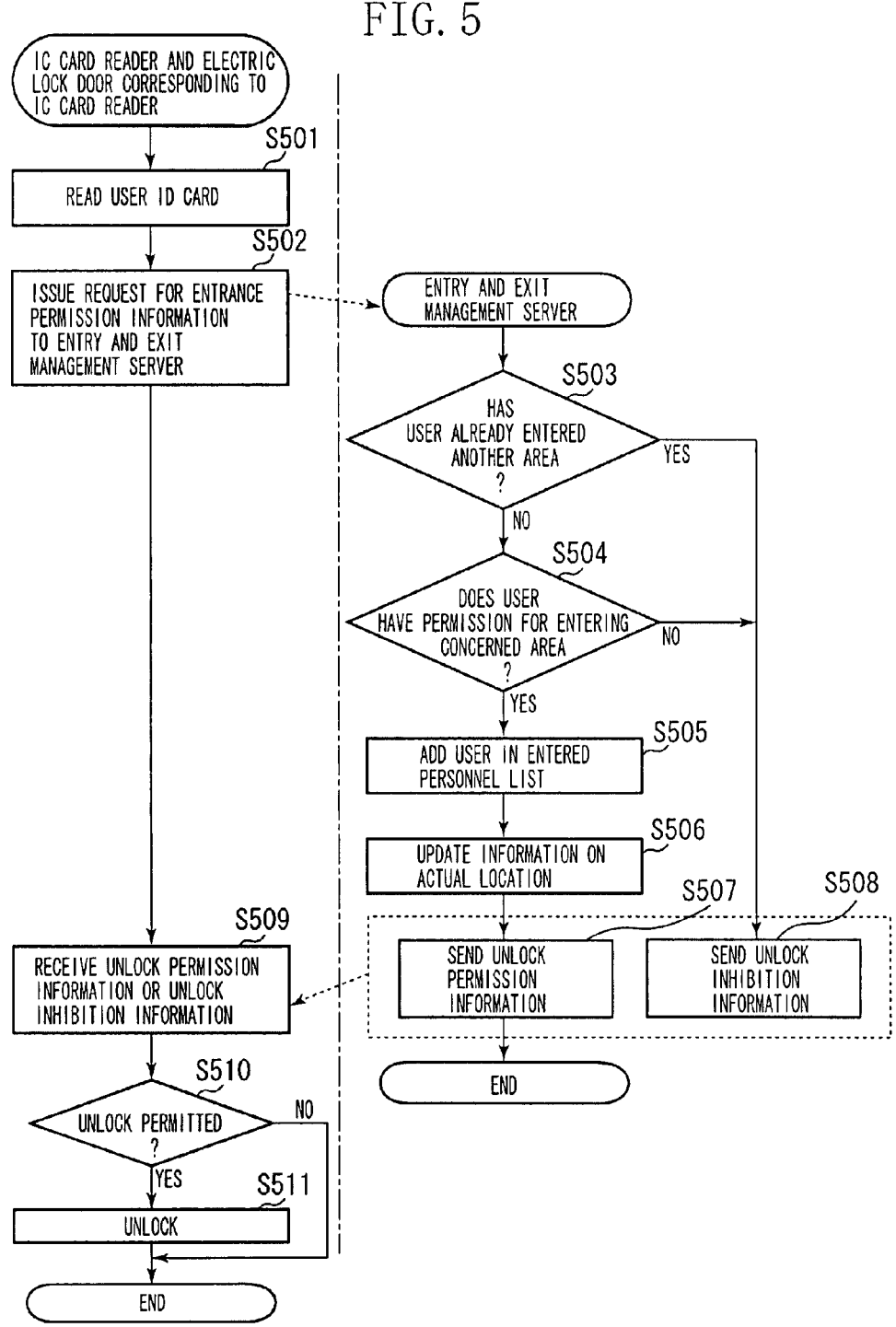
FIG. 5 is a flow chart illustrating exemplary processing performed with respect to a user entrance into an area according to an exemplary embodiment of the present invention.

FIG. 5 is a flow chart illustrating processing performed with respect to a user entering an area according to the present embodiment.

In the flow chart of FIG. 5, processing illustrated to the right of the dotted line is performed by the entry and exit management server 101. The CPU 1302 of the entry and exit management server 101 performs the corresponding processing in the flow chart of FIG. 5. On the other hand, processing illustrated to the left of the dotted line is performed by any one of the IC card readers 106a through 106c and any one of the electric lock doors 107a through 107c corresponding to each of the IC card readers 106a through 106c under the control of the entry and exit management server 101.

For discussion purposes, the following description with respect to FIG. 5 is provided for the case where a user enters area A 108. The same processing is applicable for users entering area B 109 or area C 110.

In step S501, the IC card reader 106a reads the ID card 112. In step S502, the IC card reader 106a sends the user ID information read from the ID card 112 to the entry and exit management server 101 to inquire whether the user is permitted to enter the area A 108.

In step S503, the entry and exit management server 101 refers to the user information table 400 according to the received user ID information to determine whether the user has already entered an area other than area A 108. If it is determined in step S503 that the user has not entered an area other than area A 108 (NO in step S503), then flow advances to step S504.

In step S504, the entry and exit management server 101 refers to the user information table 400 to check for the entrance permitted area information of the user and checks if the user has been permitted to enter area A 108.

If it is determined in step S504 that the user has been permitted to enter area A 108 (YES in step S504), then the flow advances to step S505. In step S505, the entry and exit management server 101 adds the user to the entered personnel list 301 for area A 108, and the flow advances to step S506. In step S506, the entry and exit management server 101 updates the current location information about the user in the user information table 400.

Then, the entry and exit management server 101 sends unlock permission information or unlock inhibition information to the electric lock door 107a. Here, the unlock permission information describes that the electric lock can be unlocked for the user. The unlock inhibition information describes that the electric lock cannot be unlocked for the user. In step S507, the entry and exit management server 101 sends information describing that the electric lock can be unlocked for the user, as unlock permission information.

On the other hand, if it is determined in step S503 that the user has already entered an area other than area A 108 (YES in step S503), or if it is determined in step S504 that the user is not permitted to enter area A 108 (NO in step S504), then the flow advances to step S508. In step S508, the entry and exit management server 101 sends to the electric lock door 107a information describing that the electric lock cannot be unlocked (i.e., unlocking of the electric lock is inhibited) as unlock inhibition information.

In step S509, the electric lock door 107a receives the unlock permission information or the unlock inhibition information sent from the entry and exit management server 101, and the flow then advances to step S510.

In step S510, the electric lock door 107a determines if unlocking of the electric lock door 107a is permitted according to the information sent from the entry and exit management server 101. If it is determined in step S510 that unlocking of the electric lock door 107a is permitted (YES in step S510), then the processing advances to step S511. In step S511, the electric lock door 107a is unlocked. When the user opens the electric lock door 107a to enter area A 108 and closes the electric lock door 107a, the electric lock door 107a is re-locked.

On the other hand, if it is determined in step S510 that the information sent from the entry and exit management server 101 describes that the electric lock door 107a cannot be unlocked (i.e., that the unlocking of the electric lock door 107a is inhibited) (NO in step S510), then the electric lock door 107a is not unlocked. In this case, the user can be notified that the user is inhibited from entering area A 108. For example, the user can be notified verbally via a nearby speaker (not shown) or visually via nearby display (not shown).

In the case where a user attempts to enter area B 109 or area C 110, the IC card reader 106b or the IC card reader 106c and the electric lock door 107b or the electric lock door 107c perform the corresponding operation described above with respect to IC card reader 106a and electric lock door 107a. Furthermore, in this case, information corresponding to the entering person management information 300 (FIG. 3) and information corresponding to the user information table 400 (FIG. 4) are used.

Figure 6:
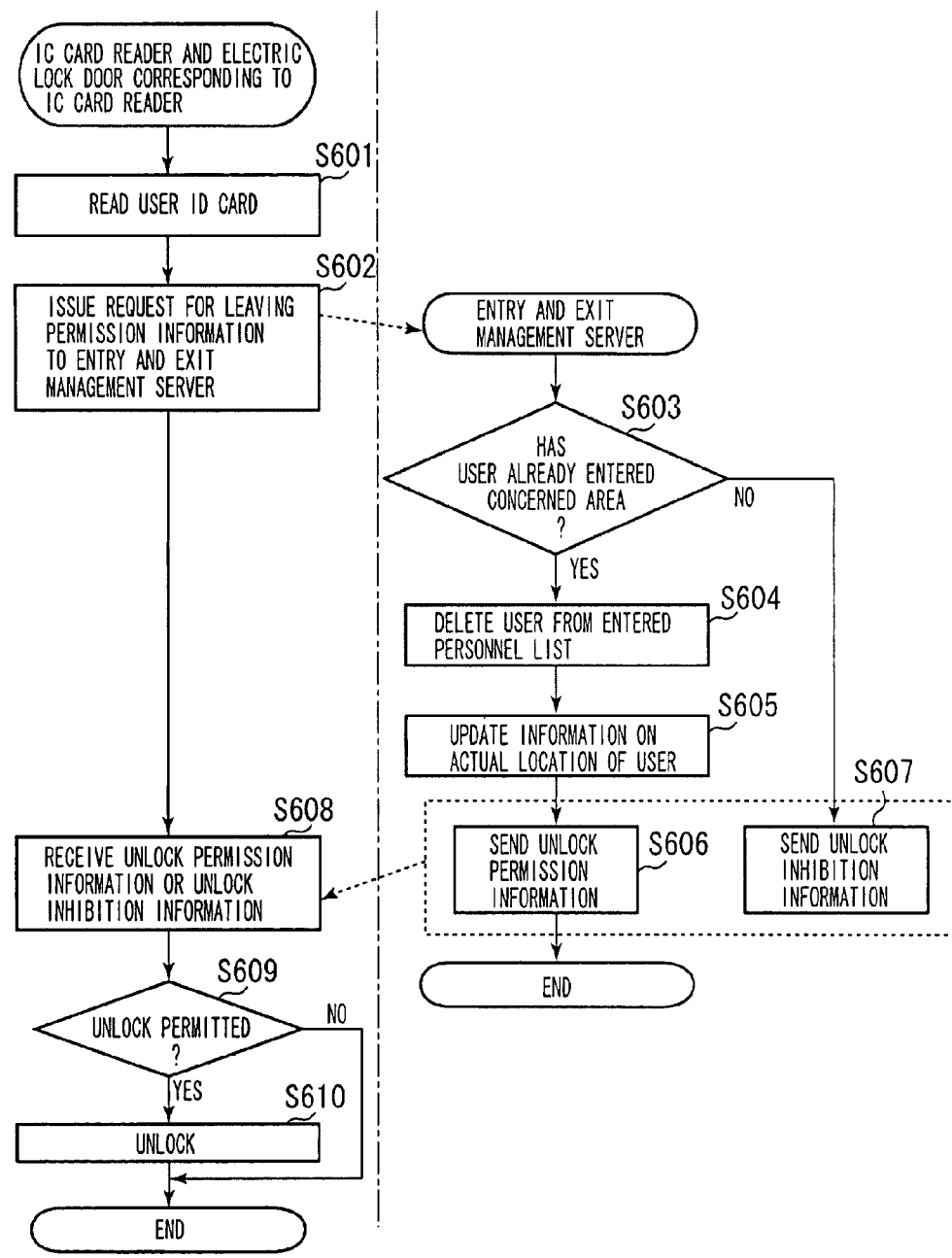
FIG. 6 is a flow chart illustrating exemplary processing performed with respect to a user exiting an area according to an exemplary embodiment of the present invention.

FIG. 6 is a flow chart illustrating processing performed in the case where a user exits an area according to the present embodiment.

In the flow chart of FIG. 6, the processing illustrated to the right of the dotted line is performed by the entry and exit management server 101. The CPU 1302 of the entry and exit management server 101 performs the corresponding processing in the flow chart of FIG. 6. On the other hand, the processing illustrated to the left of the dotted line is performed by any one of the IC card readers 106a through 106c and any one of the electric lock doors 107a through 107c corresponding to each of the IC card readers 106a through 106c under the control of the entry and exit management server 101.

As in the case of the description associated with FIG. 5, for discussion purposes, reference to area A 108 will be used to describe the process of FIG. 6. The same processing is applicable for users exiting area B 109 or area C 110.

In step S601, the IC card reader 106a reads the ID card 112. In step S602, the IC card reader 106a sends the user ID information read from the ID card 112 to the entry and exit management server 101 to inquire whether the user is permitted to exit area A 108.

In step S603, the entry and exit management server 101 refers to the user information table 400 according to the received user ID information to determine whether the user has already entered area A 108. If it is determined in step S603 that the user has entered area A 108 (YES in step S603), then the flow advances to step S604.

In step S604, the entry and exit management server 101 deletes the user ID of the user from the entered personnel list 301 for the area A 108, and the flow advances to step S605. In step S605, the entry and exit management server 101 updates the present location information about the user stored in the user information table 400.

The processing illustrated in the flow chart of FIG. 6 is performed to allow the user to move to a location other than area A 108, area B 109, or area C 110. Accordingly, in this case, when the user has moved to a location other than area A 108, area B 109, or area C 110, no information is described in the user present location information 403 of the user information table 400. Alternatively, information describing that the user does not exist in any of areas A 108, B 109, or C 110 is described in the user present location information 403 of the user information table 400.

Then, the entry and exit management server 101 sends unlock permission information or unlock inhibition information to the electric lock door 107a. Here, as described above with reference to FIG. 5, the unlock permission information describes that the electric lock can be unlocked for the user. The unlock inhibition information describes that the electric lock cannot be unlocked for the user. In step S606, the entry and exit management server 101 sends information describing that the electric lock can be unlocked for the user as unlock permission information.

On the other hand, if it is determined in step S603 that the user has not entered area A 108 yet (NO in step S603), then the entry and exit management server 101 advances to step S607. In step S607, the entry and exit management server 101 sends to the electric lock door 107a information describing that the electric lock door 107a cannot be unlocked (i.e., that the unlocking of the electric lock door 107a is inhibited) as unlock inhibition information.

When the electric lock door 107a receives the unlock permission information from the entry and exit management server 101, the electric lock door 107a is unlocked according to the received unlock permission information, and the user exits area A 108.

In step S608, the electric lock door 107a receives the unlock permission information or the unlock inhibition information sent from the entry and exit management server 101, and the flow then advances to step S609.

In step S609, the electric lock door 107a determines whether unlocking of the electric lock door 107a is permitted according to the information sent from the entry and exit management server 101. If it is determined in step S609 that unlocking of the electric lock door 107a is permitted (YES in step S609), then the flow advances to step S610. In step S610, the electric lock door 107a is unlocked. In this case, when the user opens the electric lock door 107a, exists area A 108, and closes the electric lock door 107a, the electric lock door 107a is re-locked.

On the other hand, if it is determined in step S609 that unlocking of the electric lock door 107a is inhibited (NO in step S609), the electric lock door 107a is not unlocked. In this case, the user can be notified that the user is inhibited from exiting area A 108. For example, the user can be notified verbally via a nearby speaker (not shown) or visually via a nearby display (not shown).

In the case where a user attempts to exit area B 109 or area C 110, the IC card reader 106b or the IC card reader 106c and the electric lock door 107b or the electric lock door 107c perform the corresponding operation. Furthermore, in this case, information corresponding to the entering person management information 300 (FIG. 3) and information corresponding to the user information table 400 (FIG. 4) are used.

By performing the processing in the flow charts of FIGS. 5 and 6, the entry and exit management server 101 can identify a present location of a user and thus manage a user's entry into and exit from an area.

Processing for updating an alert level according to area information will now be described with reference to FIG. 7.

First, a basic application method of an "alert level" according to the present embodiment will be briefly described. In the present embodiment, an "alert level" indicates a degree of risk of information leakage. Here, "information" includes information described on a print product produced by image forming apparatuses 103a through 103d or information displayed on a display of PC 120.

When a third party who is not authorized to be in a particular area, i.e., a non-employee or an employee who is not associated with the department associated with the particular area (hereinafter referred to as an "outsider"), is in the particular area, it is necessary to raise the alert level for the area. This is because there is a risk of information leakage if the outsider reads or obtains confidential information while in the area.

The alert level is also determined based on the size of the area or a purpose of use of the area. For example, in the case where the area in question is small and an employee authorized to be in the area is present to see what an outsider in the area is doing, the risk of information leakage is low.

Furthermore, with respect to an area used as a meeting room, the risk of information leakage does not necessarily become high if an outsider is in the area, as long as the outsider cannot freely act in the area. That is, with respect to a small area and an area used for a specific purpose, it is not always necessary to raise the alert level, even if an outsider is present in the area.

The basic method for setting an alert level according to the present embodiment is as described above. However, the method for setting an alert level for an area is not limited to this.

For example, the alert level can be variably set in a manner such that the alert level is set relatively low in daytime and relatively high in nighttime. Alternatively, the alert level can be variably set according to a day of the week, in a manner such that the alert level is set relatively low on weekdays and relatively high on weekends.

Figure 7:
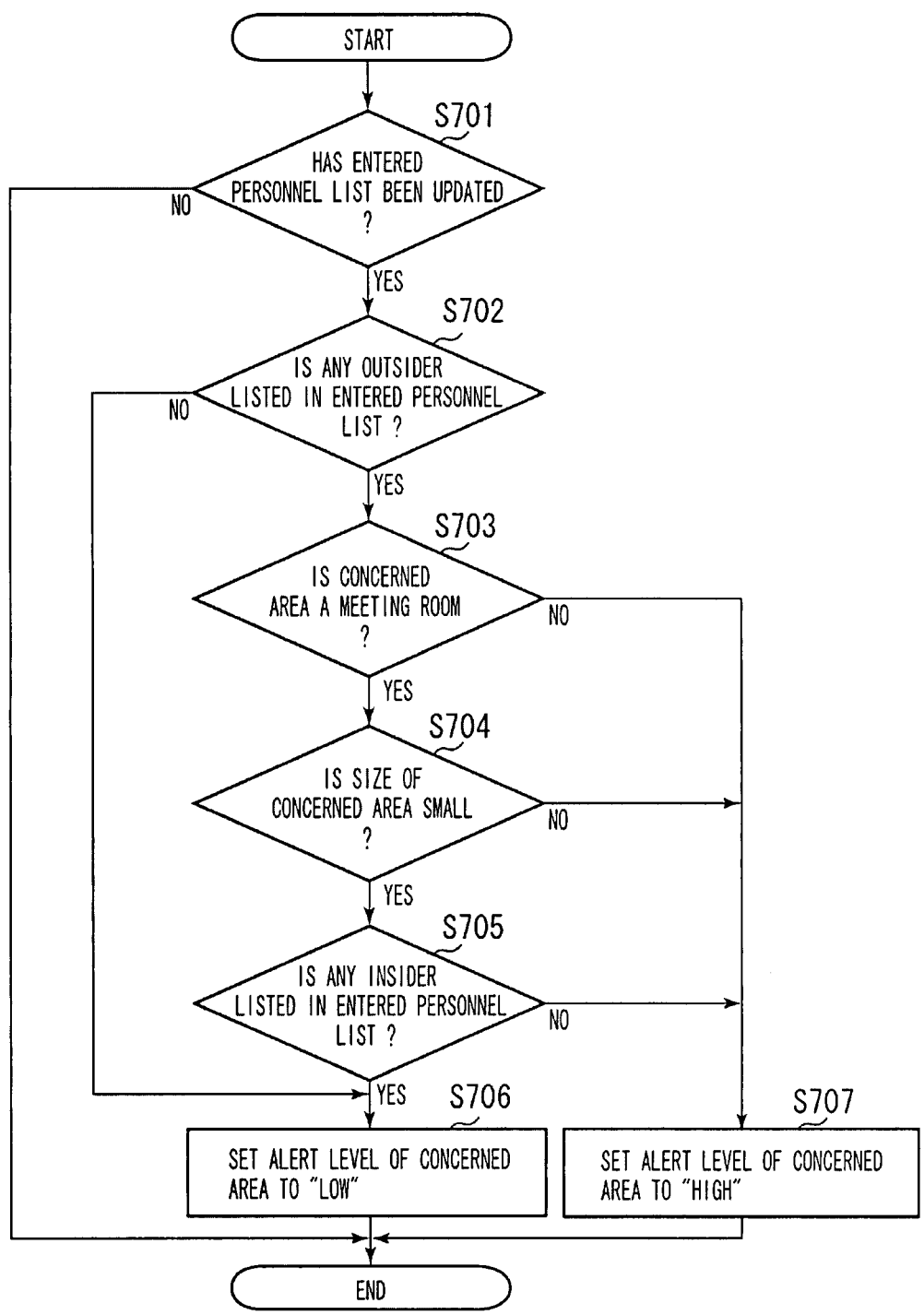
FIG. 7 is a flow chart illustrating exemplary processing for updating an alert level for an area according to an exemplary embodiment of the present invention.

FIG. 7 is a flow chart illustrating processing for updating an alert level in the area information table 200 according to the present embodiment. The processing in the flow chart of FIG. 7 is performed by the entry and exit management server 101.

The entry and exit management server 101 updates a list of persons entering or exiting from each area by the processing illustrated in the flow charts of FIGS. 5 and 6. In step S701, the entry and exit management server 101 determines whether the list of persons having entered a particular area is updated.

If it is determined in step S701 that the list of persons having entered a particular area is updated (YES in step S701), then the flow advances to step S702. In step S702, the entry and exit server 101 determines whether an outsider exists in a particular area according to the status information about all the entered persons listed in the entered person list for that particular area.

On the other hand, if it is determined in step S701 that the list of persons having entered a particular area is not updated (NO in step S701), then the entry and exit management server 101 does not change the alert level for that particular area, and the processing ends.

If it is determined in step S702 that no outsider exists in the particular area (NO in step S702), then the flow advances to step S706. In step S706, the entry and exit management server 101 determines that the risk of information leakage in that area is low, and sets the alert level information for the area to "low". On the other hand, if it is determined in step S702 that an outsider exists in the particular area (YES in step S702), then the flow advances to step S703.

In step S703, the entry and exit management server 101 determines whether the type of the particular area is a meeting room. If it is determined in step S703 that the type of the particular area is not a meeting room (NO in step S703), then the flow advances to step S707. In step S707, the entry and exit management server 101 determines that the risk of information leakage in the area is high, and sets the alert level information for the area to "high". On the other hand, if it is determined in step S703 that the type of the particular area is a meeting room (YES in step S703), then the flow advances to step S704.

In step S704, the entry and exit management server 101 refers to the area information table 200 to determine the size of the particular area, e.g., whether the area size information is "small".

If it is determined in step S704 that the area size information is not "small" (NO in step S704), then the flow advances to step S707. On the other hand, if it is determined in step S704 that the area size information is "small" (YES in step S704), the flow advances to step S705.

In step S705, the entry and exit management server 101 refers to the entered personnel list for the particular area to determine whether the entered personnel list includes information about an insider, e.g., whether an insider exists in the particular area. Here, an "insider" refers to an individual who is permitted to access confidential information and is expected to maintain the confidentiality of certain information.

If it is determined in step S705 that no insider is present in the particular area (NO in step S705), then the flow advances to step S707. In step S707, the entry and exit management server 101 determines that the risk of information leakage in the area is high because only an outsider is present in the area, and sets the alert level information for the concerned area to "high". On the other hand, if it is determined in step S705 that an insider is present in the particular area (YES in step S705), then the entry and exit management server 101 advances to step S706. In step S706, the entry and exit management server 101 sets the alert level information for the concerned area to "low".

After the entry and exit management server 101 sets the alert level for the particular area to "low" in step S706 or the entry and exit management server 101 sets the alert level for the particular area to "high" in step S707, the processing ends.

In the case where the users 114d and 115a are outsiders in the system according to the present embodiment (FIG. 1), the area information describes a content illustrated in FIG. 2.

In this case, the alert level for area A 108 is set to "low" because no outsider is present in area A 108. The alert level for area B 109 is set to "high" because an outsider is present in area B 109 and the type of area B 109 is not a meeting room. The alert level for area C 110 is set to "low" because, in a state illustrated in FIG. 1, although an outsider is present in area C 110, the type of area C 110 is a meeting room and the user 115b, who is an insider, is present in area C 110.

In the present embodiment, the entry and exit management server 101 determines whether the type of the particular area is a "meeting room" in step S703. However, the type of the particular area used as a determination reference can be any type of room, such as a server room or a reception room. In addition, a plurality of area types can be used as determination references. The type of area used as a determination reference in step S703 can be set by a system administrator by accessing the entry and exit management server 101 via a PC (e.g., the PC 120).

In the processing in the flow chart of FIG. 7, even if an outsider is present in the particular area, the alert level can be set to "low" depending on the area type and the area size. However, if enhancement of security is desired, the alert level can be determined based only on whether an outsider is present in the particular area, regardless of the area type and the area size. In this case, the alert level is set to "high" if an outsider is present, and to "low" if no outsider is present.

FIG. 8 illustrates an example of a device information table 800 stored on the HDD 1308 of the device management server 102 according to the present embodiment.

The device information table 800 includes information of a device name 801, a device model type 802, and an area name 803 of an area in which an image forming apparatus is installed. If image forming apparatuses are newly connected to the network 105, the system administrator updates the device information table 800 by accessing the device management server 102 via a PC (e.g., the PC 120).

A remote copy operation, which is an example of an operation performed by the image forming system according to the present embodiment, is described with reference to FIGS. 10, 11, and 12.

In the present embodiment, "remote copy" refers to an operation for sending image data input by an image forming apparatus to another image forming apparatus and printing out the image data at that image forming apparatus. An image forming apparatus that inputs an image is hereinafter referred to as a "local apparatus", and an image forming apparatus that prints out received image data is hereinafter referred to as a "remote apparatus".

A user generates an instruction for starting a remote copy via the operation unit 913 of the local apparatus. In starting the remote copy instructed by the user, the local apparatus sends image data and data describing the user instruction for starting the remote copy to the remote apparatus. The image data and the data for instructing a start of a remote copy is hereinafter collectively referred to as "remote copy job". The local apparatus sends a remote copy job to the remote apparatus to instruct the remote apparatus to start the remote copy.

Figure 10:
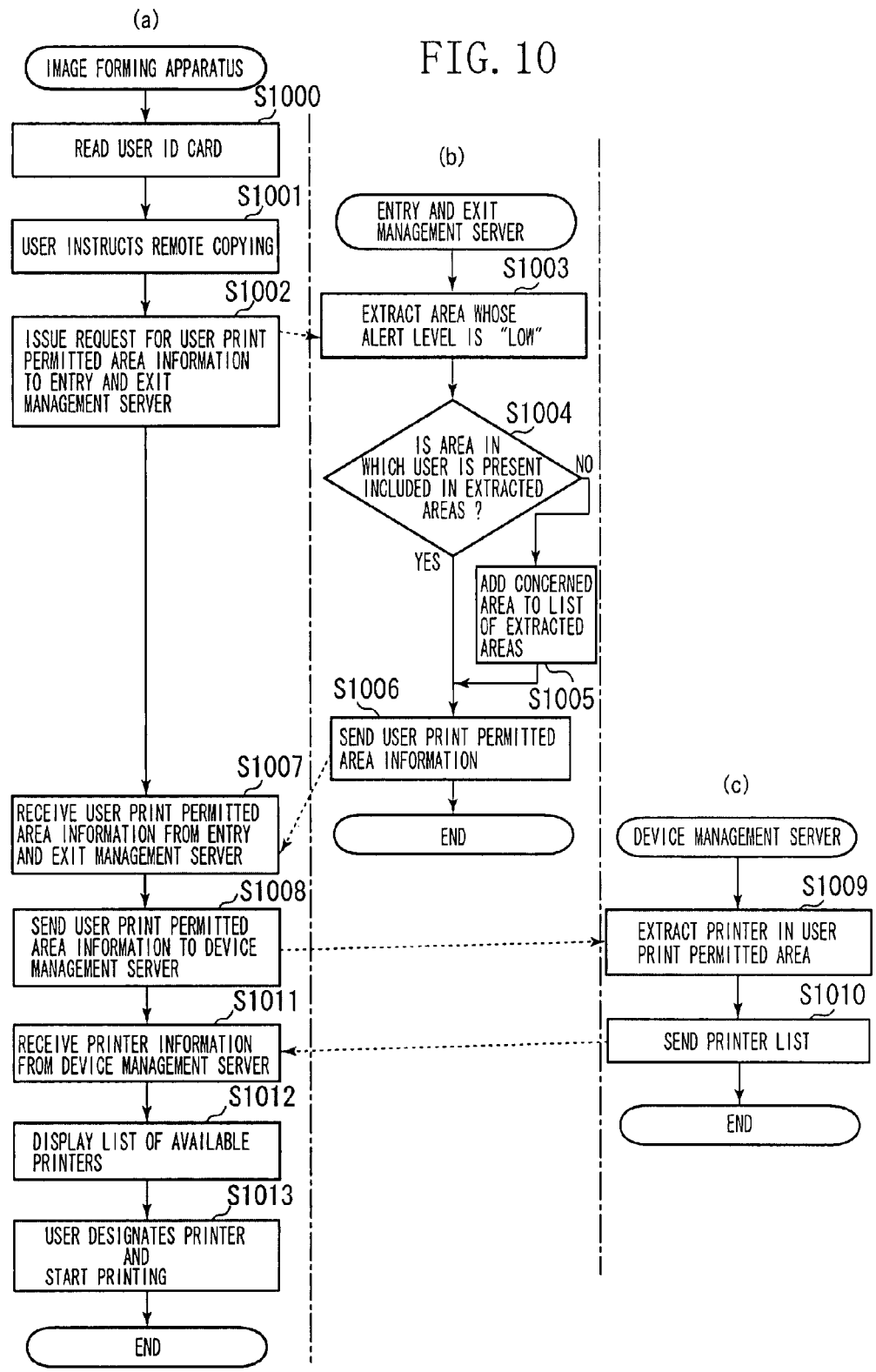
FIG. 10 is a flow chart illustrating exemplary remote copy processing according to an exemplary embodiment of the present invention.

FIG. 10 is a flow chart illustrating remote copy processing according to the present embodiment.

For discussion purposes, a case of starting a remote copy instructed by the user 113a via the image forming apparatus 103a installed in area A 108 will be used to describe the process of FIG. 10. The processing illustrated in FIG. 10 is applicable to a user starting a remote copy from an image forming apparatus in area B 109 or area C 110.

In FIG. 10, processing flow (a) is performed by the image forming apparatus 103a, processing flow (b) is performed by the entry and exit management server 101, and processing flow (c) is performed by the device management server 102.

In step S1000, the user 113a logs into the image forming apparatus 103a in area A 108 to generate an instruction for starting a remote copy. More specifically, the user 113a uses the ID card 112 in conjunction with the IC card reader 104a connected to the image forming apparatus 103a to log into the image forming apparatus 103a.

Figure 11:
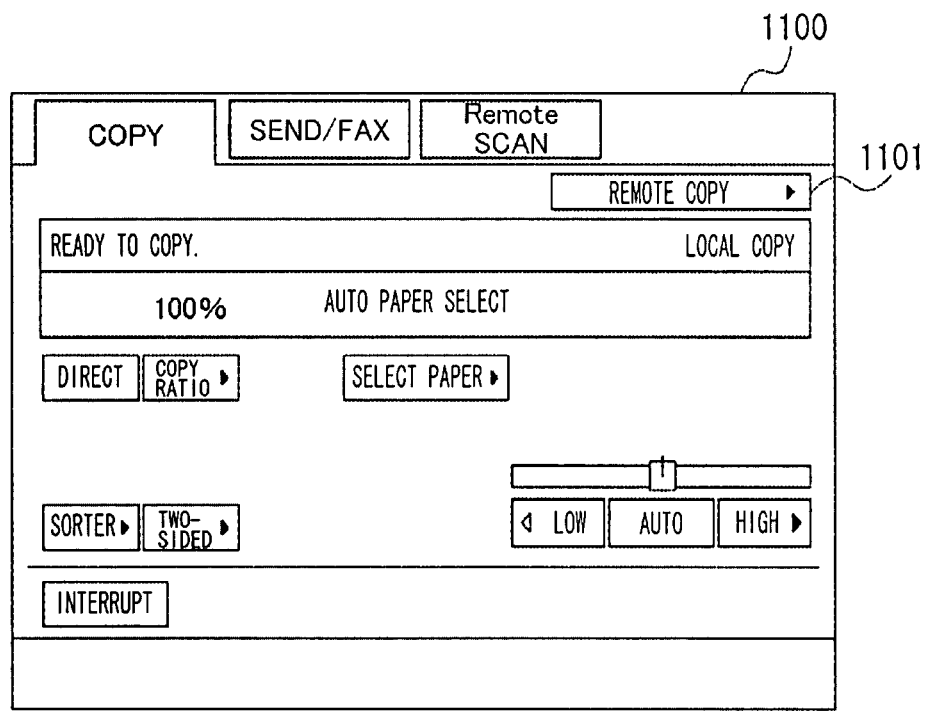
FIG. 11 illustrates an example of a display screen displayed on an operation unit of the image forming apparatus according to an exemplary embodiment of the present invention.

When the user 113a has successfully logged into the image forming apparatus 103a, the operation unit 913 of the image forming apparatus 103a displays a copy setting screen 1100 as illustrated in FIG. 11.

In step S1001, when the user 113a presses a remote copy function button 1101 (FIG. 11), the image forming apparatus 103a sends the user ID of the user 113a who has logged into the image forming apparatus 103a to the entry and exit management server 101. In step S1002, the image forming apparatus 103a accesses the entry and exit management server 101 to request for user print-permitted area information.

In step S1003, the entry and exit management server 101 extracts from the area information table an area whose alert level is set to "low". In step S1004, the entry and exit management server 101 determines whether an area in which the user 113a is present is included in the areas extracted in step S1003.

If it is determined in step S1004 that the area in which the user 113a is present is not included in the areas extracted in step S1003 (NO in step S1004), then the entry and exit management server 101 advances to step S1005. In step S1005, the entry and exit management server 101 adds the area in which the user 113a is presently located to the list of areas. Then, the processing advances to step S1006.

On the other hand, if it is determined in step S1004 that the area in which the user 113a is present is included in the areas extracted in step S1003 (YES in step S1004), then the entry and exit management server 101 advances to step S1006.

In step S1006, the entry and exit management server 101 sends the generated area information to the image forming apparatus 103a as user print permitted area information. Here, the list of areas generated by the entry and exit management server 101 includes areas in which the risk of information leakage is low even when the remote copy job is printed out therein.

As described above, in step S1006, the areas whose risk of information leakage are extracted. Accordingly, the risk that the user 113a may select an image forming apparatus installed in an area in which the risk of information leakage is high can be reduced.

In step S1007, the image forming apparatus 103a receives the user print permitted area information from the entry and exit management server 101. In step S1008, the image forming apparatus 103a sends the user print permitted area information to the device management server 102 to request information about the presence or absence of a printer in the user print permitted area. The device management server 102, according to the received area information, searches the device information table 800 for information about a printer.

In step S1009, the device management server 102 extracts a printer installed in the user print permitted area. In step S1010, the device management server 102 sends a list of printers to the image forming apparatus 103a as printer information, which includes information about a printer name, a printer model type, and a name of an area in which the printer is installed.

In step S1011, the image forming apparatus 103a receives the printer list. In step S1012, the image forming apparatus 103a displays a list of image forming apparatuses (a device list) capable of printing out the remote copy job on a display of the operation unit 913.

The image forming apparatuses installed in an area in which the risk of information leakage is low are displayed in step S1012. Accordingly, the user 113a can be prevented from selecting an image forming apparatus installed in an area whose risk of information leakage is high.

Figure 12:
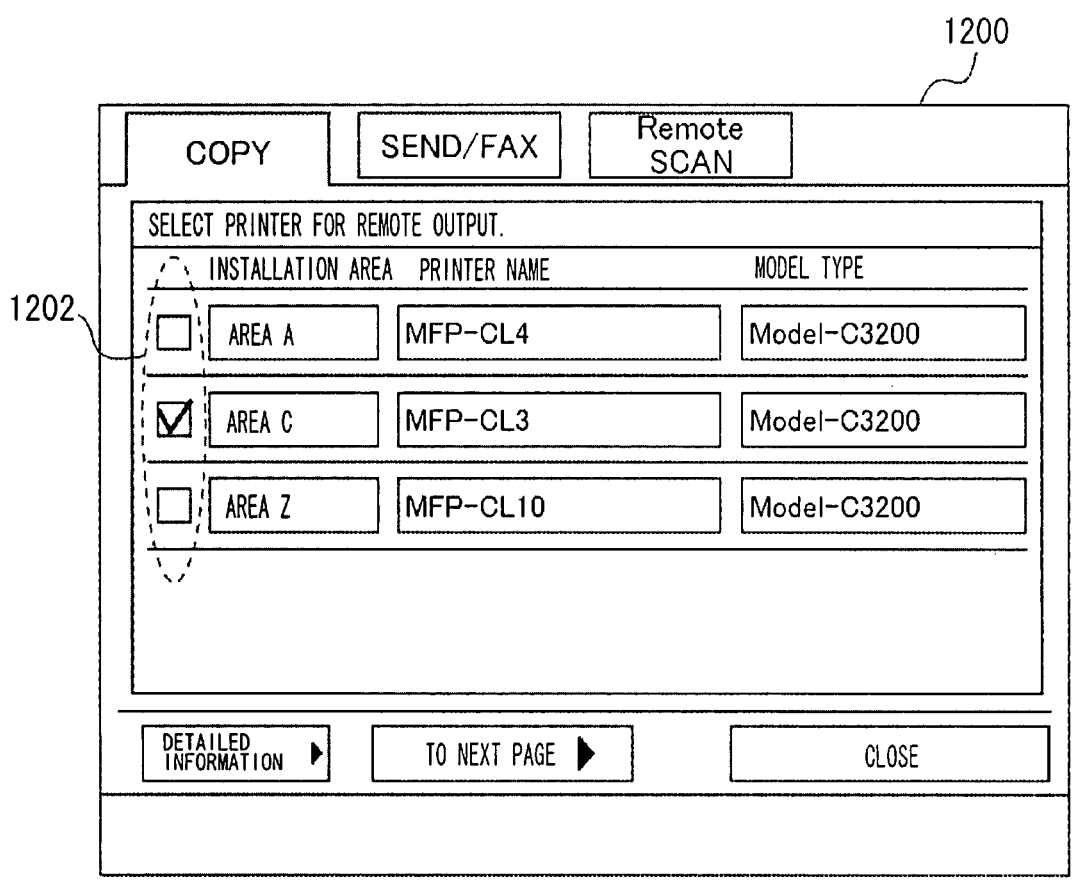
FIG. 12 illustrates an example of a display screen displayed on an operation unit of the image forming apparatus according to an exemplary embodiment of the present invention.

FIG. 12 illustrates an example of an operation screen 1200 displaying a list of printers available for printing on a display of the operation unit 913 of the image forming apparatus 103a. The printers available for printing include the image forming apparatus 103d installed in area A 108, the image forming apparatus 103c in area C 110, and an image forming apparatus (not illustrated) in an area Z (not illustrated).

A user can select an image forming apparatus to be used as a remote apparatus by checking a check box 1202. FIG. 12 illustrates a state in which the user 113a has selected the image forming apparatus 103c installed in area C 110. The user can select a plurality of remote apparatuses.

Returning to FIG. 10, the user selects an image forming apparatus that is a print destination in step S1013 and presses a job start key (not illustrated) to generate an instruction for starting a remote copy.

The image forming apparatus 103a (i.e., a local apparatus), after receiving the user instruction for starting the remote copy, reads an image of a document and generates image data according to the read document image. Then, the image forming apparatus 103a sends the generated image data to the image forming apparatus 103c (i.e., a remote apparatus) via the network 105.

After receiving the image data from the local apparatus, the image forming apparatus 103c outputs an image based on the received image data. Thus, the remote copy processing ends.

The user 113a having issued an instruction for the remote copy then exits area A 108 and enters area C 110 to obtain a print product output by the image forming apparatus 103c.

During the time period in which the user moves from area A 108 to area C 110, the print product output by the remote copy is left on a discharge tray of the image forming apparatus 103c. However, the risk of information leakage of the print product output from the image forming apparatus 103c is low because the alert level of the area C 110 is set to "low".

In the processing according to the flow chart of FIG. 10, the local apparatus is the image forming apparatus 103a. However, the local apparatus is not limited to the image forming apparatus 103a, and an image forming apparatus other than the image forming apparatus 103a can be used as a local apparatus.

In addition, in performing a remote copy according to the processing in the flow chart of FIG. 10, image forming apparatuses installed in an area that the user who has instructed the remote copy cannot enter (i.e., inhibited from entering) can be excluded from the list of printers available for printing.

If the user having instructed the remote copy selects a remote apparatus installed in an area that the user cannot enter (inhibited from entering), the user cannot enter that area to retrieve the print product output by the remote apparatus. In order to prevent this scenario from occurring, the entry and exit management server 101, in step S1003, can refer to the user information table 400 and notify the image forming apparatus of the list of areas that the user can enter whose alert level is set to "low".

The processing in the flow chart of FIG. 10 is performed in the case of a remote copy. In this regard, this processing is applicable in the case where a user generates, via the PC 120, an instruction for starting a print job by an image forming apparatus connected to the network 105. In this case, the PC 120 performs the processing flow (a) in FIG. 10 and a printer driver of the PC 120 displays the operation screen illustrated in FIG. 12.

In the present embodiment, in performing a remote copy or a print job, a user can select an image forming apparatus to be used for outputting an image based on the alert level for an area in which the image forming apparatus is installed. Accordingly, an output by an image forming apparatus with which there may arise a risk of information leakage can be prevented or reduced. Thus, information leakage by a print product can be prevented or reduced.

The present invention can also be applied to a system including a plurality of devices (e.g., a scanner, a printer, a PC, a copying machine, or a facsimile machine) and to an apparatus that includes one device (e.g., a network multifunction peripheral).

The present invention can be implemented by directly or remotely supplying a program of software implementing functions of the above-described exemplary embodiments (in the exemplary embodiments, the program corresponding to the processing performed according to the flow charts in the drawings) to a system or an apparatus and reading and executing the supplied program code with a computer of the system or the apparatus.

Accordingly, the program code itself, which is installed on the computer for implementing the functional processing of an exemplary embodiment of the present invention with the computer, implements the present invention. That is, the present invention also includes a computer program implementing the functional processing of an exemplary embodiment of the present invention.

The program can be configured in any form, such as object code, a program executed by an interpreter, and script data supplied to an OS.

As the recording medium for supplying such program code, a floppy disk, a hard disk, an optical disk, a magneto-optical disk (MO), a compact disk-read only memory (CD-ROM), a CD-recordable (CD-R), a CD-rewritable (CD-RW), a magnetic tape, a nonvolatile memory card, a ROM, and a digital versatile disk (DVD) (a DVD-read only memory (DVD-ROM) and a DVD-recordable (DVD-R)), for example, can be used.

The above program can also be supplied by connecting to a web site on the Internet by using a browser of a client computer and by downloading the program from the web site to a recording medium such as a hard disk. In addition, the above program can also be supplied by downloading a compressed file that includes an automatic installation function from the web site to a recording medium such as a hard disk. The functions of the above embodiments can also be implemented by dividing the program code into a plurality of files and downloading each divided file from different web sites. That is, a World Wide Web (WWW) server or a file transfer protocol (ftp) server for allowing a plurality of users to download the program file for implementing the functional processing configures the present invention.

In addition, the above program can also be supplied by distributing a storage medium such as a CD-ROM which stores the program according to the present invention after an encryption thereof, by allowing the user who is qualified for a prescribed condition to download key information for decoding the encryption from the web site via the Internet or an intranet, and by executing and installing in the computer the encrypted program code by using the key information.

In addition, the functions according to the embodiments described above can be implemented not only by executing the program code read by the computer, but also implemented by the processing in which an OS or the like carries out a part of or the whole of the actual processing based on an instruction given by the program code.

Further, in an exemplary embodiment of the present invention, after the program code read from the recording medium is written in a memory provided in a function expansion board inserted in a computer or a function expansion unit connected to the computer, a CPU and the like provided in the function expansion board or the function expansion unit carries out a part of or the whole of the processing to implement the functions of the embodiments described above.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-339860 filed Dec. 18, 2006, which is hereby incorporated by reference herein in its entirety.

What is claimed is:

1. An image forming system including a plurality of image forming apparatuses installed in a plurality of areas and in communication with one another via a network, the image forming system comprising:
an area management unit configured to manage area level information that indicates a level of information management with respect to each area of the plurality of areas, wherein determines, in response to a change in personnel entry into or exit from an entered area of the plurality of areas, the level of information management of the entered area based on an attribute of each person located in the entered area; and
a job issuing unit configured to send a request to the area management unit in response to receiving image formation instructions from a user, wherein, in response to the area management unit receiving the request from the job issuing unit, the job issuing unit receives a list of image forming apparatuses that is limited to those image forming apparatuses located in areas having a predetermined level of information management as indicated in the area level information,
wherein, in response to the job issuing unit receiving, as a destination of a job, at least one image forming apparatus selected from the list of image forming apparatuses, the job issuing unit issues a job, including data for image formation, to cause the at least one image forming apparatus to perform image formation.

2. The image forming system according to claim 1, wherein, for each area, the associated level of information management represents a degree of risk to the user of information leakage to a person located in that area, and
wherein, in response to a person having a predetermined attribute being located in a first area, the area management unit sets the degree of risk of information leakage in the first area to a degree that is higher than the degree of risk of information leakage set by the area management unit in response to a person having the predetermined attribute not being located in the first area, whereby a risk of information leakage to the user via an output product obtained by image formation is reduced.

3. The image forming system according to claim 2, wherein the predetermined attribute is an attribute which indicates that the person located in a first area is not authorized to be in the first area.

4. The image forming system according to claim 2, wherein the predetermined attribute is an attribute which indicates that the person located in a first area has a user status that is equivalent to being an outsider-guest to the first area.

5. The image forming system according to claim 1, further comprising an area type information storage unit configured to store area type information indicating a predetermined purpose of use of an area for each area of the plurality of areas,
wherein the area management unit determines, in response to a change in personnel entry into or exit from an entered area of the plurality of areas, the level of information management of the entered area based on both an attribute of each person located in the entered area and the area type information of the entered area.

6. The image forming system according to claim 1, further comprising an area size information storage unit configured to store area size information indicating a predetermined size of an area for each area of the plurality of areas,
wherein the area management unit determines, in response to a change in personnel entry into or exit from an entered area of the plurality of areas, the level of information management of the entered area based on both an attribute of each person located in the entered area and the area size information of the entered area.

7. The image forming system according to claim 1, further comprising a device management unit configured to manage apparatus installation area information indicating an area in which each image forming apparatus of the plurality of image forming apparatuses is installed, wherein the device management unit includes:
a determination unit configured to determine, for each area having the predetermined level of information management, whether an image forming apparatus is installed in that area based on the apparatus installation area information from the device management unit.

8. The image forming system according to claim 7, wherein, for each area, the associated level of information management represents a degree of risk to the user of information leakage to a person located in that area, and
wherein, in response to the job issuing unit acquiring, from the area management unit, information about a particular area whose level of information management is lower than level of information management of other areas, the job issuing unit notifies the device management unit of the acquired information, wherein the device management unit identifies, in response to the determination unit determining that a first image forming apparatus is installed in a given area having the predetermined level of information management, the first image forming apparatus as an first image forming apparatus that can be selected as a destination of the job issued by the job issuing unit.

9. The image forming system according to claim 8, wherein the job issuing unit includes:
a display unit configured to display the list of image forming apparatuses acquired from the device management unit; and
a receiving unit configured to receive an operation to select at least one image forming apparatus from the list of image forming apparatuses displayed on the display unit,
wherein the job issuing unit issues the job to an image forming apparatus identified according to the operation received by the receiving unit.

10. The image forming system according to claim 7, wherein, in response to the determination unit determining that an image forming apparatus is not installed in a given area having the predetermined level of information management, the device management unit determines that there is an absence of printer in the given area and does not extract an image forming apparatus for that given area.

11. The image forming system according to claim 1, wherein, the user providing image formation instructions is a user located in a first area and, in response to determining that the first area does not have the predetermined level of information management, the area management unit includes the first area as part of those areas having a predetermined level of information management, even though the first area is a concerned area.

12. The image forming system according to claim 1, wherein each area of the plurality of areas is an enclosed space that is physically partitioned by a wall from the other spaces and includes a door that is opened by an identification reader.

13. The image forming system according to claim 1, wherein the job issuing unit is an image forming apparatuses having a scanner, a printer, and a facsimile transmission function.

14. The image forming system according to claim 1, further comprising an entrance permitted area information storage unit configured to store entrance permitted area information indicating those areas from the plurality of areas that the user is permitted to enter, wherein, in response to the area management unit determining, from the entrance permitted area information in the entrance permitted area information storage unit, that the user who instructed the image formation instructions to the area management unit is inhibited from entering a given area, image forming apparatuses located in the given area are excluded from the list of image forming apparatuses received by the job issuing unit.

15. A method for an image forming system including a plurality of image forming apparatuses installed in a plurality of areas and in communication with one another via a network, the method comprising:

managing area level information that indicates a level of information management with respect to each area of the plurality of areas by determining, in response to a change in personnel entry into or exit from an entered area of the plurality of areas, the level of information management of the entered area based on an attribute of each person located in the entered area;

receiving image formation instructions from a user;

sending a request in response to receiving image formation instructions from a user;

receiving, in response receiving the request in the image forming system, a list of image forming apparatuses that is limited to those image forming apparatuses located in areas having a predetermined level of information management as indicated in the area level information;

receiving, as a destination of a job, at least one image forming apparatus selected from the list of image forming apparatuses; and issuing, in response to receiving the selected t least one image forming apparatus, a job, including data for image formation, to cause the selected at least one image forming apparatus to perform image formation.

16. A non-transitory computer-readable storage medium storing computer-executable process steps, the computer-executable process steps causing a computer to execute the method of claim 15.

* * * * *